DAVID DALZELL.

Improvement in Axle Box.

No. 4,594. Reissued Oct. 17, 1871.

Witnesses:

G. Mathys.

C. A. Perkins

Inventor:

David Dalzell.

Per

Attorneys.

AM. PHOTO-LITHOGRAPHIC CO. N.Y. (OSBORNE'S PROCESS.)

UNITED STATES PATENT OFFICE.

DAVID DALZELL, OF SOUTH EGREMONT, MASSACHUSETTS.

IMPROVEMENT IN AXLE-BOXES.

Specification forming part of Letters Patent No. 106,469, dated August 16, 1870; reissue No. 4,594, dated October 17, 1871.

*To all whom it may concern:*

Be it known that I, DAVID DALZELL, of South Egremont, in the county of Berkshire and State of Massachusetts, have invented a new and Improved Axle-Box for the hubs of wheels for carriages, wagons, &c., and which I term a compound axle-box; and I do hereby declare that the following is a full, clear, and exact description of the same, reference being had to the accompanying drawing and to the letters of reference marked thereon, making part of this specification, in which—

Figure 1:
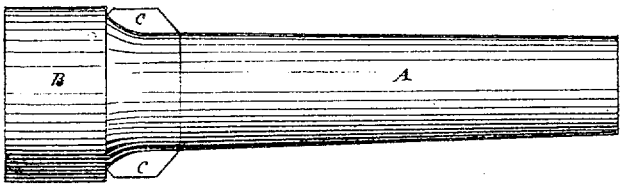
Figure 2:
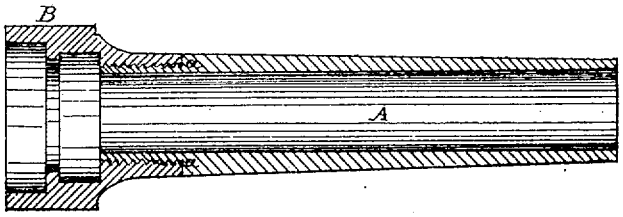
Figure 3:
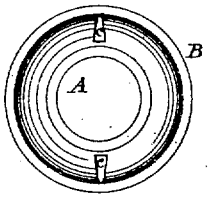

Figure 1 is a side view of my invention; Fig. 2, a longitudinal central section of the same; Fig. 3, an end view of the same.

Similar letters of reference indicate corresponding parts in the several figures.

The object of this invention is to obtain all the advantages derived from an entire wrought-iron and case-hardened axle-box, at a cost far below that attending the original mode of manufacture.

This result is accomplished by dispensing entirely with forging, which I am enabled to do by having the box composed of two parts—one part, that which runs or turns on the arm of the axle, and is the only portion subjected to wear, being of wrought-iron, case-hardened; and the other part, which is subjected to no wear, and which has hitherto been attended with great trouble and expense in forging, being of cast-iron, malleableized. In the box which I have chosen to illustrate my invention these two parts are connected by a screw-joint, but I do not limit myself to this or any particular mode of connecting or fastening the two parts together.

To enable those skilled in the art to fully understand and construct my invention I will proceed to describe it.

A represents the outer and main portion of the axle-box, which may be constructed of wrought-iron. I prefer wrought-iron tubing as being the least expensive, but do not confine myself to it, reserving the right to use wrought-iron in any form. The exterior of this part A is turned off slightly taper-form, and the interior is reamed out as true as may be and made to conform to the shape of the arm of the axle, on which it is designed to turn, said part A being case-hardened to obtain the requisite degree of hardness to resist wear. The inner part of A is turned down a suitable distance of its length to form a shoulder, *a*, and a screw-thread, *b*, is cut on the exterior of the turned-down portion to admit of the outer part of the other portion, designated by B, being screwed upon it. (See Fig. 2.) The portion B is of cast-iron, malleableized, and is cast with ears *c c*, to prevent the box from turning within the hub; and in order to prevent the two parts being casually unscrewed from each other, a key or pin may be inserted in a seat or in a hole drilled in the adjoining ends of said parts. I do not think, however, that this precaution will be necessary.

In making the entire wrought-iron box the part B was the cause of great expense in forging, and made the cost of manufacture so great as to preclude their general adoption. This difficulty is fully obviated by my invention.

Having thus described my invention, what I claim as new, and desire to secure by Letters Patent, is—

An axle-box for the hubs of carriage and wagon-wheels, constructed of two parts A B, substantially as set forth.

DAVID DALZELL.

Witnesses:
SOLON C. KEMON,
CHAS. A. PETTIT.

(31)